United States Patent
Carmody et al.

(10) Patent No.: US 7,744,206 B2
(45) Date of Patent: Jun. 29, 2010

(54) OZONE RESISTANT DYE-BASED IMAGES

(75) Inventors: Michael J. Carmody, Webster, NY (US); Thomas B. Brust, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 3 days.

(21) Appl. No.: 12/198,433

(22) Filed: Aug. 26, 2008

(65) Prior Publication Data

US 2010/0055421 A1    Mar. 4, 2010

(51) Int. Cl.
    *G01D 11/00* (2006.01)
(52) U.S. Cl. .......................................... 347/100; 347/95
(58) Field of Classification Search ................. 347/100, 347/95, 96, 101, 105; 106/31.6, 31.27, 31.13; 523/160; 428/195, 32.1
    See application file for complete search history.

(56) References Cited

U.S. PATENT DOCUMENTS 5,640,187 A *  6/1997  Kashiwazaki et al. ......... 347/96
6,106,598 A    8/2000  Iijima
6,854,840 B2   2/2005  Rao et al.

FOREIGN PATENT DOCUMENTS

JP    2003-291484    10/2003

* cited by examiner

*Primary Examiner*—Manish S Shah
(74) *Attorney, Agent, or Firm*—Arthur E. Kluegel; Andrew J. Anderson

(57) ABSTRACT

A process for providing an ozone resistant dye-based image, and a resulting image, includes jetting an ink containing the dye onto a microporous media surface to form a dye-based image, and thereafter jetting over at least a portion of the dye-based image a clear ink overcoat including a transparent polymeric binder containing dispersed inorganic nano particles, wherein the median equivalent circular diameter of all of the dispersed inorganic particles is in the range of 1 to 500 nm. Color fade due to ozone effects is diminished while maintaining jetability.

14 Claims, 2 Drawing Sheets

OZONE RESISTANT DYE-BASED IMAGES

FIELD OF THE INVENTION

The invention relates generally to the field of dye-based images, and in particular to a process for providing dye-based images having excellent stability to ozone induced fade due to the presence of an at least partial overcoat layer comprising a clear ink with transparent polymeric binder containing dispersed inorganic nano particles, and the images so protected.

BACKGROUND OF THE INVENTION

Ink compositions containing colorants used to generate images onto an image receiver can be classified as either pigment-based, in which the colorant exists as pigment particles suspended in the ink composition, or as dye-based, in which the colorant exists in solution as a fully solvated dye species that consists of one or more dye molecules. The use of pigments to form images onto a receiver presents a number of significant challenges. Pigment particles must be adequately dispersed in a suitable carrier, can be colloidally destabilized by ink components and can present settling problems during storage of the ink. Pigments can be difficult to jet through the small orifices of an inject printer and can clog the nozzles of the printhead. Pigments usually reside at the surface of the image receiver to which they are printed and image durability can be inadequate. However, pigments are desirable colorants since they are typically far more resistant to light and ozone induced fading than dyes. This provides an additional advantage for pigment-based images in that they can be printed to microporous image receivers without much concern for their inherent stability. Microporous receivers are highly desirable since the printed ink dries rapidly thereby allowing a customer to handle prints shortly after printing.

Dye-based images are typically advantaged over pigment-based images with respect to achieving high-density images. However, dye-based images are particularly susceptible (and disadvantaged to pigment-based images) to ozone induced fade mechanisms when printed onto a microporous image receiver. Microporous receivers are typically designed with inorganic particles that create small voids that are capable of absorbing ink by capillary forces very quickly. Dyes generally penetrate into the pores of the microporous receiver and generally very little of the dye resides on the surface of the receiver. However, these same pores in the receiver allow a relatively open structure for compounds such as ozone to attack the dye-based image. Furthermore, the inorganic particles contained in the image receiver can themselves liberate free radicals that accelerate the fading of the dye-based image.

Various approaches are known in the art to improve the stability of dye-based images with respect to ozone induced fade mechanisms. In one approach, stabilizer compounds (such as antioxidants or hindered amine light stabilizers) are added to the image receiver in order act as sacrificial scavengers of free radicals and ozone. Although this approach can improve dye fade, the sacrificial stabilizer compounds can cause color changes in the image receiver. Furthermore, this approach typically requires a large amount of stabilizer to be contained in the image receiver and ozone can still react with the dyes. In a second approach, the inorganic particles that comprise the image receiver can be modified with stabilizing groups through reactive chemistry. Again this requires substantial modification of the entire image receiver and has a negative impact on the cost of the receiver.

Yet another approach to improving the fade performance of dye-based images is to print the dye-based inks onto swellable image receivers. However, swellable image receivers are significantly disadvantaged to microporous image receivers with respect to dry time.

It is also known in the art to apply colorless or clear inks as overcoats to dye-based images for the purpose of improving image durability. Typically, these clear inks contain film-forming polymers, which are in the form of water-soluble polymers or water-dispersible emulsion particles. Although the polymers used in clear inks can improve the durability of images on receivers they are generally ineffective at improving the fade resistance of dye-based images.

Inkjet printing is one application where dye-based are applied to image receivers with the expectation of generating high quality images. Ink jet printing is a non-impact method for producing printed images by the deposition of ink droplets in a pixel-by-pixel manner to an image-recording element in response to digital signals. There are various methods that may be utilized to control the deposition of ink droplets on the image-recording element to yield the desired printed image. In one process, known as drop-on-demand ink jet, individual droplets are projected as needed onto the image-recording element to form the desired printed image. Common methods of controlling the ejection of ink droplets in drop-on-demand printing include thermal bubble formation (thermal ink jet (TIJ)) and piezoelectric transducers. In another process known as continuous ink jet (CIJ), a continuous stream of droplets is generated and expelled in an image-wise manner onto the surface of the image-recording element, while non-imaged droplets are deflected, caught and recycled to an ink sump.

Ink jet printers have found broad applications across markets ranging from desktop document and photographic-quality imaging, to short run printing and industrial labeling. However, in many of these applications the stability of the images can be significantly degraded by ozone. This is especially true for photographic quality images, which are expected to last for several years without substantially fading or significantly changing in color rendition. Therefore, it would be desirable to provide dye-based images that are capable of withstanding the effects of ozone induced fade, and over a wide variety of media.

U.S. Pat. No. 6,854,840 suggests the use of smectic liquid crystal materials in gel form to help improve blocking resistance, durability, gloss, optical density and to protect an image from ozone degradation. Inkjet inks are free-flowing liquid dispersions or solutions capable of ejection by a printer nozzle. If the material gels or becomes too viscous, printing can be impaired, especially when using a thermal printhead. Although application of the materials is suggested to be possible by ink jet methods, it is impractical to apply gelled materials via inkjet printheads, particularly thermal printheads, due to the high viscosity of such materials and the corresponding tendency of such materials to fail to achieve the desired ejection velocity and the consequent tendency to plug the nozzles of the ink jet printer. Further, it is desirable that an ink be usable with any kind of printhead.

Thus, it is a problem to be solved to provide a jetable overcoat clear ink containing inorganic particles that inhibit ozone degradation of a resulting image without occasioning jetting difficulties and without employing specialized ink receiving media.

SUMMARY OF THE INVENTION

The invention provides a process for providing an ozone resistant dye-based image, and a resulting overcoated image, includes jetting an ink containing the dye onto a microporous media surface to form a dye-based image, and thereafter jetting over at least a portion of the dye-based image a clear ink overcoat comprising a transparent polymeric binder containing dispersed inorganic nano particles, wherein the median equivalent circular diameter of all of the dispersed inorganic particles is in the range of 1 to 500 nm. The image is improved in ozone stability while maintaining jetability.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
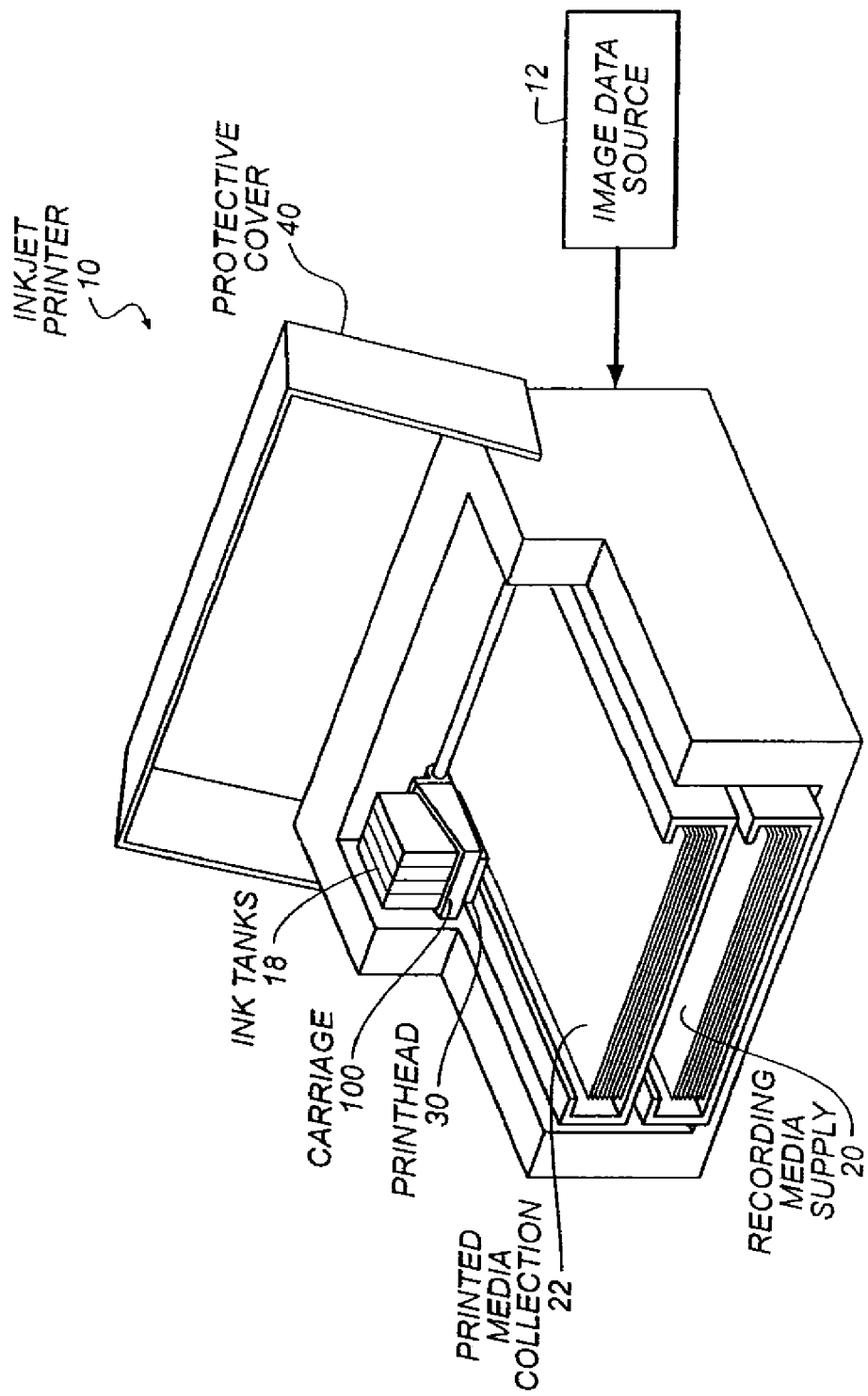
FIG. 1 is a schematic view of an inkjet printer useful in the invention.

The invention is summarized above. Dye-based images referred to in the invention are formed by applying an ink composition containing at least a dye to an ink receptive substrate herein referred to as a recording media. Dyes include those commonly used in the art of inkjet printing. For aqueous-based ink compositions, such dyes include water-soluble reactive dyes, direct dyes, anionic dyes, cationic dyes, acid dyes, food dyes, metal-complex dyes, phthalocyanine dyes, anthraquinone dyes, anthrapyridone dyes, azo dyes, rhodamine dyes, solvent dyes, and the like. Some examples of such dyes are Direct yellow 132 (CAS 10114-86-0) and Direct yellow 86 (CAS 50295-42-3), acid yellow 23 (CAS 1934-21-0), and acid yellow 17 (CAS 6359-98-4) which have good hue and relatively good ozone fastness, but poor light stability. U.S. Pat. Nos. 6,468,338 and 6,464,767 disclose water-soluble azoindole dyes for use in ink jet printing including dyes derived from diazotizable heteroaromatic amines. Some other water soluble dyes include Acid Red 52; azo-naphthol dyes such as Acid Red 249, Direct Red 227, or Reactive Red 31; azo-aniline dyes; azo-thiazole dyes; arylazonaphthylamine dyes such as Direct Red 75 or Ilford M-377; metal-complex azo dyes such as Reactive Red 23, anthrapyridone dyes such as Acid Red 80 and 82, CAS No. 224628-70-0 sold as JPD Magenta EK-1 Liquid from Nippon Kayaku Kabushiki Kaisha; CAS No. 153204-88-7 sold as INTRA-JET® Magenta KRP from Crompton and Knowles Colors; and the metal azo dyes disclosed in U.S. Pat. Nos. 5,997,622 and 6,001,161.

The dye employed can be a charged dye. In one embodiment the charge of the dye is anionic. Such dyes are anionic by virtue of ionizable substituents which have one or more negative charges at the pH of the ink. Common substituents include sulfonic acids, carboxylic acids, phosphonic acids, phosphoric acids, phenols and their salts, along with combinations thereof. Such dyes are often referred to as acid or direct dyes.

The dyes may also be polymeric dye colorants having dye chromophores as part of the polymer composition. Examples of polymeric dye colorants include, but are not limited to: water-fast polymeric colorants made from polyethyleneimines described in U.S. Pat. Nos. 4,664,708 and 4,375,357; polyamidoamines bonded with a reactive dye through an amino group described in U.S. Pat. No. 5,534,052; emulsion particles of a polymeric dyestuff described in U.S. Pat. No. 4,471,079; and those described for use in aqueous inkjet inks in US Patent Publication No. 2004/0147631. Especially useful polymeric dye colorants are hydrophobically modified styrene maleic anhydride copolymers described in US Patent Publication No. 2008/0122915.

Dyes useful for forming the dye-based image of the present invention may be any color including, but not limited to, those commonly used in the art of inkjet printing. The dyes may be colored cyan, magenta, yellow, orange, green, red, blue, or black and may be combinations of the same or different colored dyes within the same image.

The dye-based image referred to in the present invention is applied to the surface of an image recording media in the form of an ink composition. Typical ink compositions useful for applying the dye to the image recording media contain the dye dissolved in a suitable carrier. The carrier for the dye is desirably water, an organic solvent, or a mixture of water and organic solvent. Typical organic solvents useful as carriers for the dye include those commonly used in the art of printing inks. The organic solvent may be a humectant. Representative examples of humectants which may be employed in the present invention include: (1) triols, such as glycerol, 1,2,6-hexanetriol, 2-ethyl-2-hydroxymethyl-propane diol, trimethylolpropane, alkoxlated triols, alkoxylated pentaerythritols, saccharides and sugar alcohols; (2) diols, such as ethylene glycol, diethylene glycol, triethylene glycol, propylene glycol, polyalkylene glycols having four or more alkylene oxide groups, 1,3-propane diol, 1,2-butane diol, 1,3-butane diol, 1,4-butane diol, 1,2-pentane diol, 1,5-pentanediol, 1,2-hexanediol, 1,6-hexane diol, 2-methyl-2,4-pentanediol, 1,2-heptane diol, 1,7-hexane diol, 2-ethyl-1,3-hexane diol, 1,2-octane diol, 2,2,4-trimethyl-1,3-pentane diol, 1,8-octane diol; and thioglycol, or a mixture thereof. Typical aqueous dye-based ink compositions useful in the invention may contain 5-30 weight percent humectant(s), especially from 6-20% and most desirably from about 6-15% humectant The ink compositions may also include organic solvents often referred to in the art as co-solvents or penetrants. Representative examples of co-solvents used in the aqueous dye-based ink compositions include: (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) lower mono- and di-alkyl ethers derived from the polyhydric alcohols such as, ethylene glycol monomethyl ether, ethylene glycol monobutyl ether, ethylene glycol monoethyl ether acetate, diethylene glycol monomethyl ether, and diethylene glycol monobutyl ether acetate; (3) nitrogen-containing compounds, such as urea, 2-pyrrolidinone, N-methyl-2-pyrrolidinone, and 1,3-dimethyl-2-imidazolidinone; and (4) sulfur-containing compounds, such as 2,2'-thiodiethanol, dimethyl sulfoxide, and tetramethylene sulfone. Typical aqueous-based ink compositions useful in the invention may contain 2-20 weight percent co-solvent(s).

Surfactants may be added to the dye-based ink composition to adjust the surface tension of the ink to an appropriate level or to control intercolor bleed between the inks. The surfactants may be anionic, cationic, amphoteric, or nonionic and used at levels of 0.01 to 5% of the ink composition.

Examples of suitable nonionic surfactants include: linear or secondary alcohol ethoxylates (such as the TERGITOL® 15-S and TERGITOL® TMN series available from Union Carbide and the BRIJ® series from Uniquema); ethoxylated alkyl phenols (such as the TRITON® series from Union Carbide); fluoro surfactants (such as the ZONYLS® from DuPont and the FLUORADS® from 3M); fatty acid ethoxylates, fatty amide ethoxylates, ethoxylated and propoxylated block copolymers (such as the PLURONIC® and TETRONIC® series from BASF); ethoxylated and propoxylated silicone based surfactants (such as the SILWET® series from CK Witco); alkyl polyglycosides (such as the GLUCOPONS® from Cognis) and acetylenic polyethylene oxide surfactants (such as the Surfynols from Air Products).

Examples of anionic surfactants include: carboxylated (such as ether carboxylates and sulfosuccinates); sulfated (such as sodium dodecyl sulfate); sulfonated (such as dodecyl benzene sulfonate, alpha olefin sulfonates, alkyl diphenyl oxide disulfonates, fatty acid taurates and alkyl naphthalene sulfonates); phosphated (such as phosphated esters of alkyl and aryl alcohols, including the STRODEX® series from Dexter Chemical); phosphonated and amine oxide surfactants; and anionic fluorinated surfactants. Examples of amphoteric surfactants include betaines, sultaines, and aminopropionates. Examples of cationic surfactants include quaternary ammonium compounds, cationic amine oxides, ethoxylated fatty amines, and imidazoline surfactants. Additional examples are of the above surfactants are described in "McCutcheon's Emulsifiers and Detergents: 1995, North American Editor."

A biocide (0.01-1.0% by weight) may also be added to the dye-based ink to prevent unwanted microbial growth which may occur in the ink over time. A preferred biocide for the inks employed in the present invention is PROXEL® GXL (Zeneca Colours Co.) at a concentration of 0.05-0.1% by weight and/or KORDEK® (Rohm and Haas Co.) at a concentration of 0.05-0.1% by weight (based on 100% active ingredient). Additional additives which may optionally be present in an ink jet ink composition include thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers, and defoamers.

The pH of the aqueous dye-based ink compositions may be adjusted by the addition of organic or inorganic acids or bases. Inorganic bases are preferred; however, small amounts of organic bases, such as triethanolamine, may be used to adjust the pH of the ink. Useful inks may have a preferred pH of from about 4 to 10, depending upon the type of dye being used. Desirably, the pH of the present ink is from 6 to 9, more usefully from 7.5 to 8.5.

The dye-based inks may contain inorganic particles. Examples of inorganic particles useful in dye-based inks of the present invention include, but are not limited to, alumina, boehmite, clay, calcium carbonate, titanium dioxide, calcined clay, aluminosilicates, silica, or barium sulfate. The inorganic particles used in the dye-based ink compositions may be present in any effective amount, generally from 0.01 to 20% by weight, and desirably from 0.01 to 6% by weight. The exact choice of inorganic particles will depend upon the specific application and performance requirements of the printed image.

Polymers can be present in the dye-based inks. The polymers can act as binders or jetting-aids (in the case of an inkjet printer) or can fulfill other useful functions. These polymers can be classified as water-soluble polymers, water-reducible polymers or water-dispersible polymeric particles.

The term "water-soluble" is defined herein to mean the polymer, or salt thereof, is dissolved in water such that a dilute solution of the polymer is visually clear.

The term "water-reducible" is defined herein to mean the polymer can be diluted with water to form reasonably stable dispersions of polymer aggregates swollen by solvent and water, as described in "Organic Coatings: Science and Technology" (2nd Edition by Wicks, Jones and Papas, published by Wiley-Interscience, 1999). Such polymers have hydrophilic groups in some monomers, but are not water soluble until neutralized by base.

The term "water-dispersible" is defined herein to mean the polymer exists in the form of discrete particles in water, the particles being dispersed or suspended and often stabilized against flocculation and settling by the use of dispersing agents. In contrast to a water-soluble polymer, a dilute solution of a water-dispersible polymer appears turbid.

Water-soluble polymers useful in the ink compositions include nonionic, anionic, and amphoteric polymers. Representative examples of water soluble polymers include, polyvinyl alcohols, polyvinyl acetates, polyvinyl pyrrolidones, carboxymethyl cellulose, polyethyloxazolines, polyamides, polyurethanes (such as those found in U.S. Pat. No. 6,268,101), polyacrylic acids, styrene-acrylic acid copolymers (such as the JONCRYL® resins from BASF, TRUDOT® IJ-4655 from MeadWestvaco Corp., and VANCRYL® 68S from Air Products and Chemicals, Inc., and polymers exemplified in U.S. Pat. No. 6,866,379 and US Patent Publication No. 2005/0134665 A1.

Water-dispersible polymers are generally classified as either addition polymers or condensation polymers, both of which are well known to those skilled in the art of polymer chemistry. Examples of water-dispersible polymers include acrylics, styrenics, polyethylenes, polypropylenes, polyesters, polyamides, polyurethanes, polyureas, polyethers, polycarbonates, polyacid anhydrides, and copolymers consisting of combinations thereof. Such polymers can be ionomeric; film-forming, non-film-forming, fusible, or heavily cross-linked and can have a wide range of molecular weights and glass transition temperatures. Examples of water dispersible polymeric particles useful in dye-based inks are styrene-acrylic copolymers sold under the trade names JONCRYL® (S.C. Johnson Co.), UCAR® (Dow Chemical Co.), JONREX® (MeadWestvaco Corp.), and VANCRYL® (Air Products and Chemicals, Inc.); sulfonated polyesters sold under the trade name EASTMAN AQ® (Eastman Chemical Co.); and polyethylene or polypropylene resin emulsions and polyurethanes (such as the WITCOBONDS® from Witco Corp.). Core-shell polymer particles have also been employed in inkjet inks for water-fastness and rub-resistance improvements (U.S. Pat. Nos. 5,814,685; 5,912,280; 6,057,384; 6,271,285; and 6,858,301). Additional examples of water dispersible polymer particles include the thermoplastic resin particles as disclosed in U.S. Pat. Nos. 6,147,139 and 6,508,548. The polymer particles may be a mixture of high and low glass transition temperature polymers such as those disclosed in U.S. Pat. No. 6,498,202. Additionally, core-shell polymer particles as described in U.S. Pat. Nos. 5,814,685; 5,912,280; 6,057,384; 6,271,285; and 6,858,301 can be employed. It is also possible to include in the ink, in addition to the durability enhancing polymer particles, heavily cross-linked polymer particles.

Inks useful in the invention may be applied to a wide variety of substrates including, but not limited to, glass, ceramic, metal, plastic, wood, and paper. The inks of the present invention may be applied to a photoglossy or plain paper receiver. The two types of receivers are distinguished from one another in that the photoglossy receiver is manufactured with a coated layer above the underlying paper support. Examples of plain papers include Kodak bright white ink jet paper, Hewlett Packard Color ink jet paper, Xerox Extra Bright white ink jet paper, Georgia-Pacific ink jet Paper Catalog Number 999013, Staples ink jet paper International Paper Great White MultiUse 20 Paper, Xerox Premium Multipurpose Paper, Hammermill Copy plus or ForeMP paper, and Hewlett Packard Multipurpose paper. The plain papers may include papers that have been treated with multivalent salts during or after manufacture of the paper. The ozone resistance of dye-based images on a plain paper receiver is only marginally improved by the present invention. This is because ozone can readily diffuse through the backside of plain paper receiver to attack the dye-based image.

Inks useful in the invention having improved ozone resistance can be printed as digital images having photographic quality if a suitable recording medium, such as a photoglossy ink jet paper, is used. Photoglossy receivers may be further categorized as being a swellable media (having a non-porous polymer coating) or a microporous media, although hybrid designs are also well known. Swellable media are less desirable than microporous media as they are relatively slow drying. Dye-based images on microporous media of the present invention show improved ozone resistance and are rapid drying.

Microporous media useful in the invention are typically comprised of at least one image-receiving layer containing water-absorbing fine particles or powders mixed with a polymeric hydrophilic binder to form a microporous structured coating. The hydrophilic particles or powders are typically polycrystalline inorganic materials such as boehmite alumina, silica gels, titanium dioxide, calcium carbonate, barium sulfate, zinc oxide, and clays or amorphous inorganic materials such as aluminum silicates. The photoglossy receivers may include multiple image-receiving layers which have been designed to manage fluid uptake or to affect surface properties of the resulting receiver and image, such as gloss.

The image-receiving layer(s) of the microporous receiver may contain polymeric binders. In one useful embodiment, the polymeric binder may be a hydrophilic polymer such as poly(vinyl alcohol), poly(vinyl pyrrolidone), gelatin, cellulose ethers, poly(oxazolines), poly(vinylacetamides), partially hydrolyzed poly(vinyl acetate/vinyl alcohol), poly (acrylic acid), poly(acrylamide), poly(alkylene oxide), sulfonated or phosphated polyesters and polystyrenes, casein, zein, albumin, chitin, chitosan, dextran, pectin, collagen derivatives, collodian, agar-agar, arrowroot, guar, carrageenan, tragacanth, xanthan, rhamsan, and the like. Desirably, the hydrophilic polymer is poly(vinyl alcohol), hydroxypropyl cellulose, hydroxypropyl methyl cellulose, a poly(alkylene oxide), poly(vinyl pyrrolidinone), poly(vinyl acetate) or copolymers thereof or gelatin. In general, good results are also obtained with polyurethanes, vinyl acetate-ethylene copolymers, ethylene-vinyl chloride copolymers, vinyl acetate-vinyl chloride-ethylene terpolymers, acrylic polymers, or derivatives thereof.

Other binders can also be used such as hydrophobic materials, for example, poly(styrene-co-butadiene), polyurethane latex, polyester latex, poly(n-butyl acrylate), poly(n-butyl methacrylate), poly(2-ethylhexyl acrylate), copolymers of n-butylacrylate and ethylacrylate, copolymers of vinylacetate and n-butylacrylate, and the like. A poly(styrene-co-butadiene) latex is desired. Mixtures of hydrophilic and latex binders are useful, and a mixture of PVA with a poly(styrene-co-butadiene) latex is particularly useful.

A dye mordant can be employed in an image-receiving layer of the microporous media. Examples of such mordants include cationic lattices such as disclosed in U.S. Pat. No. 6,297,296 and references cited therein, cationic polymers such as disclosed in U.S. Pat. No. 5,342,688, and multivalent ions as disclosed in U.S. Pat. No. 5,916,673, the disclosures of which are hereby incorporated by reference. Examples of these mordants include polymeric quaternary ammonium compounds, or basic polymers, such as poly(dimethylaminoethyl)-methacrylate, polyalkylenepolyamines, and products of the condensation thereof with dicyanodiamide, amine-epichlorohydrin polycondensates. Further, lecithins and phospholipid compounds can also be used. Specific examples of such mordants include the following: vinylbenzyl trimethyl ammonium chloride/ethylene glycol dimethacrylate; poly(diallyl dimethyl ammonium chloride); poly(2-N,N,N-trimethylammonium)ethyl methacrylate methosulfate; poly (3-N,N,N-trimethyl-ammonium)propyl methacrylate chloride; a copolymer of vinylpyrrolidinone and vinyl(N-methylimidazolium chloride; and hydroxyethylcellulose derivatized with 3-N,N,N-trimethylammonium)propyl chloride. In one useful embodiment, the cationic mordant is a polymer containing quaternary ammonium groups.

Additives that optionally can be included in the image-receiving layer include pH-modifiers like nitric acid, crosslinkers, rheology modifiers, water-retention aides, surfactants, UV-absorbers, biocides, lubricants, dyes, optical brighteners, multivalent salts, and other conventionally known additives.

The image-receiving layer thickness of the microporous media may range from 1 to 25 µm, desirably between 2 and 15 µm, more usefully between 2 and 10 µm, in one particularly useful embodiment, from 3 to 6 µm.

An image-receiving layer may be applied to one or both support surfaces of the microporous media through conventional pre-metered coating methods (such as extrusion, curtain, or slide hopper coating) or post-metered coating methods (such as blade, air knife, rod, roll coating, and the like). The design of the microporous media vary widely depending on materials and paper manufacturing processes and should not be construed to limit the scope of the present invention.

The ozone resistant dye-based image of the invention comprises a transparent polymeric binder containing dispersed inorganic nano-particles disposed over a portion of the dye-based image. The transparent polymeric binder containing dispersed inorganic nano-particles are applied to the dye-based image after the dye-based ink is applied to the image receiver. The polymeric binder containing dispersed inorganic nano-particles can be applied by coating, spraying or jetting an aqueous composition containing the binder and nano-particles onto the image receiver. In one embodiment, the aqueous composition containing binder and nano-particles is loaded into a cartridge, similar to those used for holding colored ink, and is jetted from a printhead of an inkjet printer over a portion of the dye-based image.

The ozone fade improving aqueous composition comprising the transparent polymeric binder and dispersed inorganic nano-particles can be jetted over the entire dye-based image by overcoating the entire surface of the image receiver. In another embodiment, the ozone fade improving aqueous composition can be disposed over the dye-based image in an image- or dye-wise fashion using an inkjet printer. In one desirable embodiment, the ozone fade improving composition is applied over a portion of the dye-based image in a single pass of the printhead. One useful method of printing the ozone fade composition over a portion of the dye-based image involves ejecting the composition from nozzles of a printhead in a single pass such that greater than or equal to 30% of the area of the image receiver over which the printhead is passed is covered by the composition, as described in U.S. Ser. No. 12/026,953, filed Feb. 6, 2008.

The ozone fade improving composition is disposed over at a least a portion of the dye-based image such that one or more colored dyes is covered by the composition. In one embodiment, the ozone fade improving composition can be disposed over less than all of the dye-based colorants that comprise the image. This allows for individual dye colorants within a set of dye colorants to be individually balanced for fade performance. For example, a set of cyan, magenta, and yellow dyes can be applied to an image receiver and only the yellow dyes of the image can be overcoated with the ozone fade improving composition. This allows for extended fade performance of an image to be balanced such that each of the colorants fades at approximately the same rate. Alternatively, the amount of coverage of the ozone improving composition can be varied in an image-wise fashion over each of the different colorants that comprise the dye-based image. In this manner a dye having a greater susceptibility to fade would be overcoated with a greater amount of the ozone fade improving composition than a dye that has a lesser susceptibility to fade.

Transparent polymer binders useful for improving the ozone resistance of the dye-based images of the present invention include those commonly used as polymer binders in the art of clear inks for inkjet printing, such as those mentioned earlier with respect to the inks. A transparent polymer binder is defined as a polymer that when applied to the dye-based image does not adversely affect the spectral properties of the printed dye image. In one desired embodiment, the transparent polymer binder dries to a colorless film and does not absorb light in the visible region of the electromagnetic spectrum. However, it is appreciated that the polymer binder may contribute small amounts of color since it is well known that the synthesis of polymers can result in color impurities. Polymeric binders useful for containing the dispersed inorganic nano-particles include those water-soluble, water-reducible, or water-dispersible polymer binders described above. Especially useful polymer binders include polyurethanes and mixtures of polyurethanes and acrylics described in US Publication Numbers 2006/0100306, 2006/0100307, and 2006/0100308, which are incorporated herein in their entirety.

The ozone resistant dye-based image comprises polymeric binder that contains dispersed inorganic nano-particles. The overcoat clear inks are free-flowing liquid dispersions or solutions capable of ejection by an inkjet printer nozzle. Nano-particles are herein defined as discreet particles having an equivalent spherical diameter of from 1 to 500 nanometers. Suitably, the median equivalent circular diameter of all of the dispersed inorganic particles is in the range of 1 to 500 nm. Desirably, the median equivalent circular diameter of all of the dispersed inorganic particles is in the range of from 1 nm to 200 nm and typically from 1 nm to 100 nm. Pure or synthetic materials that are not highly liquid crystalline in nature are preferred because they do not tend to form plate-like (smectic) multilayer structures that lead to undesirably high viscosity values which may even gel the material. The presence of a binder helps to alleviate gelling.

The nano-particles dispersed in the polymer binder of the invention are inorganic particles. Inorganic particles useful as the nano-particles of the present invention include metal oxides (such as, aluminum oxide, calcium oxide, magnesium oxide, titanium dioxide, zinc oxide, and aluminum stabilized colloidal silica as disclosed in U.S. Pat. No. 5,925,178). In one embodiment, the range of ratios of the transparent polymeric binder to all inorganic particles (nano and otherwise) in the dye-based image is from 20:1 to 0.5:1 and is desirably from 10:1 to 0.5:1. In one particularly useful embodiment the range of useful ratios of polymeric binder to inorganic pigment particles is from 10:1 to 0.8:1.

In a desirable embodiment of the invention, the particles are predominantly three dimensional exhibiting similar dimensions along the x, y, and z axes, as opposed to being plate- or sheet-like in conformation or aspect ratio less than 4:1, on average. In one embodiment the particles approach sphere-like dimensions so that they have little adverse effect on viscosity and do not gel. Suitably, the particles are non-porous and desirably they are primarily single crystal structures without layering.

The film thickness of the dried overcoat layer comprising nano-particles dispersed in transparent polymer binder need only be such that the recorded images can be thoroughly coated. Typical dried film thicknesses useful for overcoating the dye-based image are from 0.1 to 100 µm, desirably from 0.5 to 20, and in one useful embodiment from 0.5 to 10 µm. It is further appreciated that some of the overcoat composition can penetrate far enough into the image receiver such that the dye and components of the overcoat composition are in contact; however, a predominant portion of the dried overcoat layer resides over the top of the dye-based image thereby providing improved ozone fade resistance.

Inkjet printing systems useful in the invention comprise a printer, at least one imaging ink, and an image recording element, typically a sheet (herein also "media"), suitable for receiving ink from an inkjet printer. Inkjet printing is a non-impact method for producing printed images by the deposition of ink droplets in a pixel-by-pixel manner to an image-recording element in response to digital data signals. There are various methods that may be utilized to control the deposition of ink droplets on the image-recording element to yield the desired printed image. In one process, known as drop-on-demand inkjet, individual ink droplets are projected as needed onto the image-recording element to form the desired printed image. Common methods of controlling the projection of ink droplets in drop-on-demand printing include piezoelectric transducers, thermal bubble formation, or an actuator that is made to move.

Drop-on-demand (DOD) liquid emission devices have been known as ink printing devices in ink jet printing systems for many years. Early devices were based on piezoelectric actuators such as are disclosed in U.S. Pat. Nos. 3,946,398 and 3,747,120. A currently popular form of ink jet printing, thermal ink jet (or "thermal bubble jet"), uses electrically resistive heaters to generate vapor bubbles which cause drop emission, as is discussed by Hara, et al., in U.S. Pat. No. 4,296,421. In another process, known as continuous inkjet, a continuous stream of droplets is generated, a portion of which are deflected in an image-wise manner onto the surface of the image-recording element, while un-imaged droplets are caught and returned to an ink sump. Continuous inkjet printers are disclosed in U.S. Pat. Nos. 6,588,888; 6,554,410; 6,682,182; 6,793,328; 6,866,370; 6,575,566; 6,517,197.

Alternative embodiments of the invention may provide reduced coalescence, bleed, smearing, and sensitivity to extremes of humidity, improved manufacturability, transport through a printer, image quality, dry time, color density, gloss, abrasion and scratch resistance, resistance to cracking, layer adhesion, water-fastness, image stability, resistance to image fade attributable to ambient gases or visible or UV light exposure, reduced gloss artifacts such as differential gloss and color gloss, reduced curl during manufacturing, storage, printing, or drying.

FIG. 1 shows one schematic example of an inkjet printer 10 that includes a protective cover 40 for the internal components of the printer. The printer contains a media supply 20 in a tray. The printer includes one or more ink tanks 18 (shown here as having four inks) that supply ink to a printhead 30. The printhead 30 and ink tanks 18 are mounted on a carriage 100. The printer includes a source of image data 12 that provides signals that are interpreted by a controller (not shown) as being commands to eject drops of ink from the printhead 30. Printheads may be integral with the ink tanks or separate. Exemplary printheads are described in U.S. Pat. No. 7,350,902. In a typical printing operation a media sheet travels from the recording media supply 20 in a media supply tray to a region where the printhead 30 deposits droplets of ink onto the media sheet. The printed media collection 22 is accumulated in an output tray.

Figure 2:
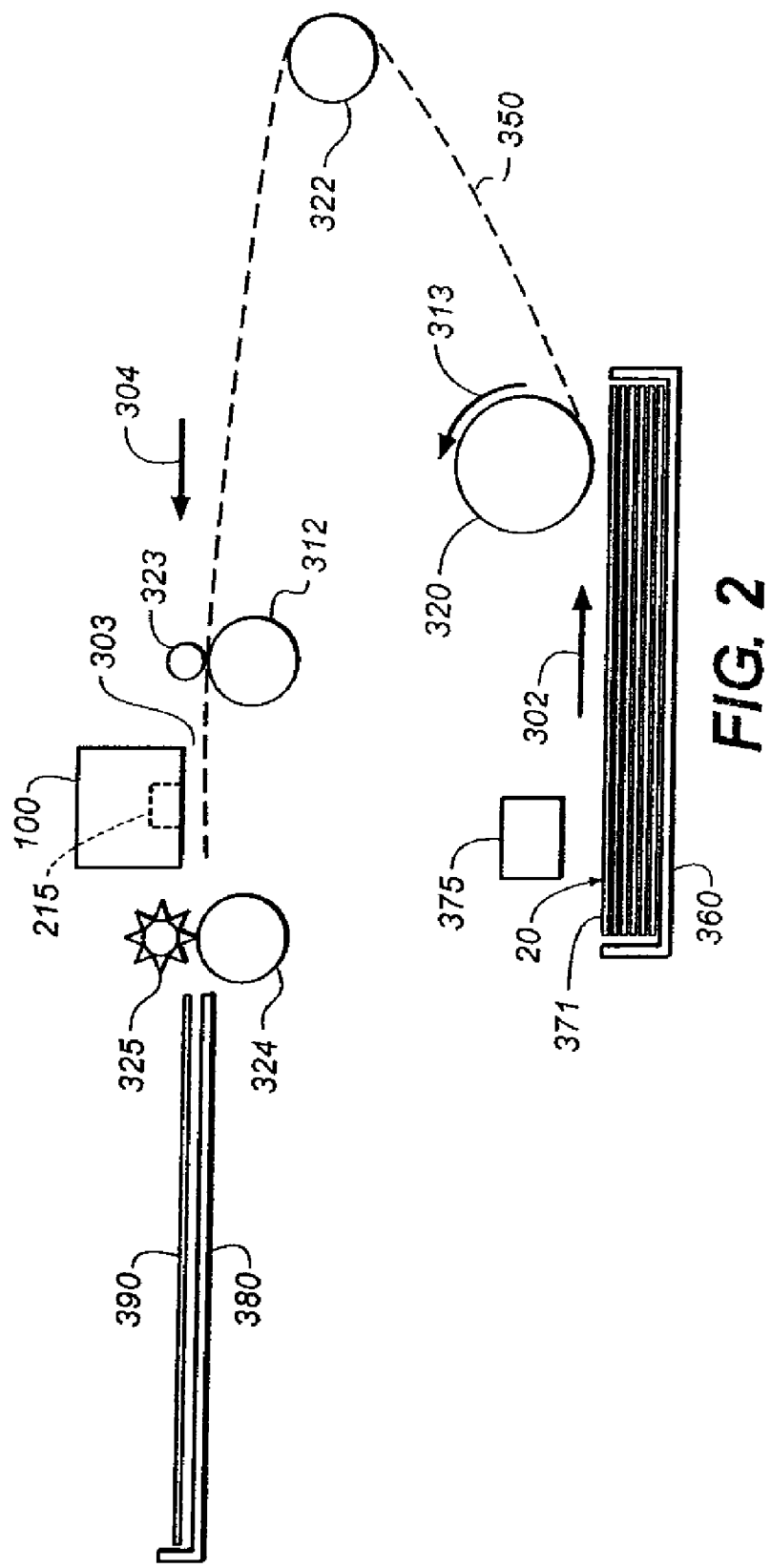
FIG. 2 is a schematic diagram showing the flow of media from the supply tray to the collection tray.

FIG. 2 shows schematically how the inkjet printer comprises a variety of rollers to advance the media sheet, for example paper, through the printer, as shown schematically in the side view of FIG. 2. In this example, a pickup roller 320 moves the top media sheet 371 of a stack 20 of media that is located in a media supply tray 360 in the direction of arrow 302. A turn roller 322 acts to move the media sheet around a C-shaped path 350 (in cooperation with a curved surface—not shown) so that the media sheet continues to advance along direction arrow 304 in the printer. The media sheet 371 is then moved by feed roller 312 and idler roller(s) 323 to advance along direction 304 across the print region 303 and under printer carriage 100. A discharge roller 324 and star wheel(s) 325 transport the printed media sheet 390 along direction 304 and to an output tray 380. For normal media pick-up and feeding, it is desired that all driven rollers rotate in forward direction 313. An optional sensor 215 capable of detecting properties of the media sheet or indicia contained thereon can be mounted on the carriage 100. A further optional sensor 375 capable of detecting properties of the media sheet or indicia contained thereon may be positioned facing the front or back surface of the media sheet 371 and located at any advantageous position along the media transport path 350 including the media supply tray 360. Alternatively, the inkjet printing system comprises a printer supplied with a continuous roll of ink recording medium that may be cut to individual prints subsequent to printing.

Different types of image-recording elements (media) vary widely in their ability to absorb ink. Inkjet printing systems provide a number of different print modes designed for specific media types. A print mode is a set of rules for determining the amount, placement, and timing of the jetting of ink droplets during the printing operation. For optimal image reproduction in inkjet printing, the printing system must match the supplied media type with the correct print mode. The printing system may rely on the user interface to receive the identity of the supplied media, or an automated media detection system may be employed. A media detection system comprises a media detector, signal conditioning procedures, and an algorithm or look-up table to decide the media identity. The media detector may be configured to sense indicia present on the media comprising logos, patterns, and the like corresponding to media type, or may be configured to detect inherent media properties, typically optical reflection. The media detector may be located in a position to view either the front or back of the media sheet, depending on the property being detected. As exemplified in FIG. 2, the media detector 375 may be located to view the media sheet 371 in the media supply tray 360 or along the media transport path 350. Alternatively, optical sensor 251 may be located at the print region 303. Usefully, the media comprise a repeating pattern detectable by the method described in U.S. Pat. No. 7,120,272. Alternatively, a number of media detection methods are described in U.S. Pat. No. 6,585,341.

Example 1

Ink Preparation

A series of clear inks was prepared according to the general formula shown in Table 1.

TABLE 1

General Clear Ink Formula

| Ingredient | Concentration (% by weight) |
|---|---|
| Glycerol | 12 |
| Ethylene Glycol | 6 |
| 1,2-Pentanediol | 2 |
| Tergitol 15-S-5 | 0.75 |
| Polyetherpolyurethane | 1.6 |
| Benzylmethacrylate:methacrylic acid copolymer | 0.80 |

Nanoparticulate dispersions (from Nanophase Technologies) of inorganic particles were added to this base formula and sufficient deionized water to make 125 g of clear ink. Amounts are shown in Table 2

TABLE 2

Clear Ink Examples

| Ink | NanoArc R1112W (alumina) wt % in ink | NanoArc Q1112W (zinc oxide) wt % in ink |
|---|---|---|
| Comparative Example A | none | none |
| Inventive Example B | 0.25 | none |
| Inventive Example C | 0.5 | none |
| Inventive Example D | 1.0 | none |
| Inventive Example E | 2.0 | none |
| Inventive Example F | none | 1.0 |
| Inventive Example G | none | 2.0 |

Description of the Porous Medium

An inkjet receiver was prepared on a polyethylene resin-coated (RC) paper support. The RC paper carried a backprint comprising diagonal lines of infrared absorbing ink for purposes of media identification in a printer equipped to detect the line spacing. On the front side of the support were coated three layers in order from the support, a foundation layer, an intermediate layer and a top layer. The foundation layer composition comprised colloidal alumina particles (Catapal 200, Sasol, 140 nm particles), binder poly (vinyl alcohol) (GH-23, Gohsenol), crosslinkers glyoxal (Catabond GHF) and boric acid, and surfactants (Olin 10 G and APG 325) coated at 6.5 g solids/m2. The intermediate layer comprised colloidal alumina particles (Catapal 200, Sasol, 140 nm particles), binder poly (vinyl alcohol) (GH-23, Gohsenol), crosslinkers glyoxal (Cartabond GHF) and boric acid, and surfactants (Olin 10 G and APG 325) coated at 60 g solids/m2. The top layer comprised fumed alumina particles (PG-008, Cabot, 130 nm particles), binder poly (vinyl alcohol) (GH-23, Gosenol), latex dispersion of polymeric cationic mordant as described in U.S. Pat. No. 6,045,917, surfactant (Zonyl FSN), and crosslinkers glyoxal (Cartabond GHF) and boric acid at coated at 2.2 g/m2.

Fading of Dye Images

A Canon i960 printer was used to print density step wedges of the Canon BCI-6 Cyan, Magenta, and Yellow dyes, and a composite Black. In a separate pass through the printer, a uniform coat of clear ink was printed over the top of all of the wedges. Two prints in which no clear ink at all was overprinted were included as comparisons. These prints were allowed to dry overnight, their densities read, and a step at which density equaled 1.0 was interpolated. The prints were hung for a week in a chamber in which an air atmosphere containing 5 ppm ozone was continuously circulated. Densities were again read, and the percent density loss from the initial 1.0 was calculated. Results are show in Table 3.

Even low levels of alumina (ratio of transparent polymer binder to inorganic particles as low as 10:1) give significant improvements in resistance to dye fade by ozone.

Example 2

Color cartridges for the Kodak 5000 series AIO Inkjet printer were filled with Encad GX cyan (212681), magenta (212682), yellow (212683), and photo black (212684) dye inks in the chambers appropriate for that color. The protective ink chambers were filled with either Comparative clear ink A, or Inventive clear inks B, C, D, or E. Density step wedges were printed in one of two print modes. The KODAK ULTRA

TABLE 3

Fade from 1.0 Density after 1 Week 5 ppm Ozone

|  | Loss of Yellow (blue density) in pure color yellow | Loss of Yellow (blue density) in Neutral | Loss of Magenta (green density) in pure color magenta | Loss of Magenta (green density) in Neutral | Loss of Cyan (red density) in pure color cyan | Loss of Cyan (red density) in Neutral |
|---|---|---|---|---|---|---|
| No Clear Ink | 75.8 | 72.7 | 74.9 | 74.6 | 53.6 | 82.9 |
| No Clear Ink | 79.3 | 74.9 | 80.0 | 77.9 | 55.8 | 84.6 |
| Comparative A | 73.1 | 84.2 | 82.8 | 89.6 | 69.4 | 90.0 |
| Inventive D | 5.4 | 25.6 | 21.6 | 29.6 | 44.4 | 53.4 |
| Inventive E | 6.0 | 23.8 | 23.0 | 21.3 | 38.3 | 42.4 |
| Inventive F | 24.9 | 64.5 | 43.7 | 69.9 | 52.7 | 77.4 |
| Inventive G | 15.9 | 60.2 | 48.6 | 61.0 | 49.5 | 69.8 |

The results in Table 3 show that dye-based images containing no ozone improving composition fade very rapidly when exposed to ozone. It can be seen that Comparative Example A (a dye-based image containing transparent polymeric binders, but no inorganic particles) shows significant ozone fade similar to that of the control samples in which no clear ink was overprinted. The Inventive Examples (containing a combination of inorganic particles dispersed in a transparent polymeric binder disposed at least partially over a dye-deposit) all show a significant decrease in ozone fade for the pure colors and those colors in the composite neutral. The ratio of transparent polymer binder to inorganic particles in inventive examples D, E, F and G ranges from about 1.2:1 to 0.8:1.

Inventive dye images Examples B and C, which contained lower levels of alumina and transparent polymeric binder, were treated in the same manner with a repeat of Inventive D, and the results are shown in Table 4.

TABLE 4

Ozone Fade of Dye-Based Images with Low Levels of Alumina

| Clear Ink | Pure Yellow Patch | Pure Magenta Patch | Pure Cyan Patch |
|---|---|---|---|
| Comparative A | 67.1 | 85.6 | 69.0 |
| Inventive B | 27.2 | 62.7 | 60.0 |
| Inventive C | 14.2 | 59.2 | 47.6 |
| Inventive D | 14.6 | 42.2 | 35.4 |

Premium Pro Photo Paper print mode (subsequently referred to as Pro Photo Mode) is a 9-pass mode in which all of the clear ink is printed in the final two passes. In the KODAK ULTRA Premium Photo-High Gloss mode (subsequently referred to as High Gloss Mode) the colored inks and the clear ink are printed simultaneously in all the seven passes.

The densities of the step wedges were read, and the wedges placed for one day in a chamber whose atmosphere contained 5 parts per million ozone. The densities were read again, and the percentage fade from an interpolated initial density value of 1.0 were calculated and shown in Tables 5 and 6.

TABLE 5

Ozone fade as a function of print mode and concentration of nano-alumina in the clear ink-Pro Photo Mode (Inventive)

| Clear Ink | Pure Yellow Patch | Yellow in Green patch | Yellow in Red patch | Yellow in Neutral Patch |
|---|---|---|---|---|
| A | 22.54 | 24.01 | 30.18 | 28.17 |
| B | 18.55 | 15.46 | 26.53 | 21.15 |
| C | 17.47 | 13.04 | 22.73 | 17.78 |
| D | 14.65 | 7.75 | 20.62 | 11.65 |
| E | 14.65 | 9.07 | 16.72 | 7.68 |

| Clear Ink | Pure Magenta Patch | Magenta in Blue patch | Magenta in Red patch | Magenta in Neutral Patch |
|---|---|---|---|---|
| A | 86.45 | 73.67 | 83.71 | 74.80 |
| B | 85.25 | 67.18 | 83.11 | 71.24 |
| C | 82.07 | 60.21 | 81.37 | 68.05 |
| D | 77.64 | 52.88 | 80.12 | 58.48 |
| E | 76.71 | 48.07 | 74.86 | 49.41 |

| Clear Ink | Pure Cyan Patch | Cyan in Green patch | Cyan in Blue patch | Cyan in Neutral Patch |
|---|---|---|---|---|
| A | 57.68 | 61.35 | 57.70 | 65.11 |
| B | 56.79 | 58.02 | 53.43 | 61.92 |

TABLE 5-continued

Ozone fade as a function of print mode and concentration of nano-alumina in the clear ink-Pro Photo Mode (Inventive)

| | | | | |
|---|---|---|---|---|
| C | 56.07 | 55.17 | 46.63 | 58.72 |
| D | 56.21 | 44.32 | 41.22 | 50.58 |
| E | 53.99 | 43.41 | 36.24 | 41.93 |

TABLE 6

Ozone fade as a function of print mode and concentration of nano-alumina in the clear ink-High Gloss Mode (Comparative)

| Clear Ink | Pure Yellow Patch | Yellow in Green patch | Yellow in Red patch | Yellow in Neutral Patch |
|---|---|---|---|---|
| A | 21.47 | 21.04 | 28.38 | 23.61 |
| B | 23.62 | 22.29 | 31.53 | 26.06 |
| C | 22.95 | 22.55 | 30.51 | 24.95 |
| D | 22.72 | 21.78 | 29.90 | 24.90 |
| E | 23.57 | 23.17 | 30.52 | 25.47 |

| Clear Ink | Pure Magenta Patch | Magenta in Blue patch | Magenta in Red patch | Magenta in Neutral Patch |
|---|---|---|---|---|
| A | 80.12 | 66.11 | 76.89 | 68.32 |
| B | 82.78 | 68.31 | 79.44 | 71.67 |
| C | 82.69 | 67.29 | 79.21 | 71.07 |
| D | 81.96 | 66.43 | 78.27 | 70.15 |
| E | 82.87 | 67.79 | 79.28 | 71.17 |

| Clear Ink | Pure Cyan Patch | Cyan in Green patch | Cyan in Blue patch | Cyan in Neutral Patch |
|---|---|---|---|---|
| A | 49.40 | 46.31 | 46.26 | 48.56 |
| B | 50.92 | 49.68 | 49.37 | 53.07 |
| C | 50.49 | 51.05 | 49.06 | 52.94 |
| D | 47.79 | 48.42 | 47.36 | 51.34 |
| E | 49.81 | 51.76 | 48.93 | 53.24 |

It is clear from Table 5 that when the clear ink comprising both transparent polymer binder and inorganic oxide particles is printed over the top of the colored inks in the Pro Photo Print Mode, that ozone fade of the resulting dye deposit on the image recording medium is inhibited. When the colored and clear inks are printed simultaneously in High Gloss Print Mode, there is no effect of the clear ink on ozone fade as suggested by the data in Table 6.

The invention has been described with reference to preferred embodiments; however, it will be appreciated that variations and modifications can be effected by a person of ordinary skill in the art without departing from the scope of the invention. The entire content of the patents and publications referred to in this document are incorporated herein by reference.

PARTS LIST

10 inkjet printer
12 image data source
18 ink tanks
20 recording medium supply
22 printed media collection
30 printhead
40 protective cover
100 carriage
215 optical sensor
302 media direction
303 print region
304 media direction
313 forward direction
320 pickup roller(s)
322 turn roller(s)
323 idler roller(s)
324 discharge roller(s)
325 star wheel(s)
360 media supply tray
371 media sheet
375 further optical sensor
380 media output tray
390 printed media sheet

The invention claimed is:

1. A process for forming an ozone resistant dye-based image, comprising:
    jetting an ink containing the dye onto a microporous media surface to form a dye-based image, and
    thereafter jetting over at least a portion of the dye-based image a clear ink overcoat comprising a transparent polymeric binder containing dispersed inorganic nano particles, wherein the median equivalent circular diameter of all of the dispersed inorganic particles is in the range of 1 to 500 nm, and wherein the dispersed inorganic nano particles are predominantly three dimensional exhibiting similar dimensions along x, y, and z axes, with an aspect ratio less than 4.

2. The process of claim 1 wherein the median equivalent circular diameter of all of the dispersed inorganic particles is in the range of from 1 to 200 nm.

3. The process of claim 1 wherein the median equivalent circular diameter of all of the dispersed inorganic particles is in the range of from 1 to 100 nm.

4. The process of claim 1 wherein the dispersed inorganic particles comprise metal oxides.

5. The process of claim 4 wherein the dispersed inorganic particles comprise a metal oxide of a metal selected from the group consisting of aluminum, calcium, magnesium, titanium, zinc, and aluminum stabilized silica.

6. The process of claim 1 wherein the weight ratio of the transparent polymeric binder to particles is from 20-0.5:1.

7. The process of claim 1 wherein the transparent polymeric binder is water reducible or water dispersible.

8. The process of claim 1 wherein the transparent polymeric binder comprises a polyurethane or polyacrylic polymer.

9. The process of claim 1 wherein the transparent polymeric binder containing dispersed inorganic nano particles is jetted over the microporous media surface in an imagewise fashion.

10. The process of claim 1 wherein the transparent polymeric binder containing dispersed inorganic nano particles is jetted over the microporous media surface in an amount that varies with variations in the amount and types of colorants present in the image.

11. The process of claim 1 wherein the transparent polymeric binder containing dispersed inorganic nano particles is jetted over the microporous media surface by applying a coating of uniform thickness over the microporous media surface.

12. The process of claim 1 wherein the jetting is accomplished using a thermal head.

13. The process of claim 1 wherein the dispersed inorganic nano particles are predominantly oxides of aluminum.

14. The process of claim 1 wherein the thickness of the clear ink overcoat is from 0.5 to 20 μm.

* * * * *